US006968061B2

(12) United States Patent
Houlberg et al.

(10) Patent No.: US 6,968,061 B2
(45) Date of Patent: *Nov. 22, 2005

(54) METHOD WHICH USES A NON-VOLATILE MEMORY TO STORE A CRYPTO KEY AND A CHECK WORD FOR AN ENCRYPTION DEVICE

(75) Inventors: Christian L. Houlberg, Ventura, CA (US); Gary S. Borgen, Camarillo, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 905 days.

This patent is subject to a terminal disclaimer.

(21) Appl. No.: 09/853,922

(22) Filed: May 7, 2001

(65) Prior Publication Data

US 2002/0015498 A1 Feb. 7, 2002

Related U.S. Application Data

(63) Continuation-in-part of application No. 09/505,830, filed on Feb. 17, 2000, now Pat. No. 6,859,537.

(51) Int. Cl.[7] .............................................. H04L 9/00
(52) U.S. Cl. ...................................................... 380/277
(58) Field of Search ................................ 380/277–280; 244/158 R, 159, 172

(56) References Cited

U.S. PATENT DOCUMENTS

| 4,278,837 | A | * | 7/1981 | Best ............................ 713/190 |
| 5,156,357 | A | * | 10/1992 | Rollingson et al. ......... 244/3.14 |
| 5,187,352 | A | * | 2/1993 | Blair et al. .................. 235/382 |
| H01414 | H | * | 2/1995 | Borgen ........................ 713/913 |
| 5,513,261 | A | * | 4/1996 | Maher .......................... 380/277 |
| 5,682,403 | A | * | 10/1997 | Tu et al. ....................... 375/220 |
| 5,768,495 | A | * | 6/1998 | Campbell et al. ............. 714/25 |
| 5,883,956 | A | * | 3/1999 | Le et al. ....................... 713/170 |
| 6,065,679 | A | * | 5/2000 | Levie et al. .............. 235/462.47 |
| 6,473,742 | B1 | * | 10/2002 | Sager ............................ 705/51 |
| 6,760,752 | B1 | * | 7/2004 | Liu et al. ...................... 709/206 |

* cited by examiner

*Primary Examiner*—Andrew Caldwell
*Assistant Examiner*—Jeffrey Popham
(74) *Attorney, Agent, or Firm*—David S. Kalmbaugh

(57) ABSTRACT

A method using a Non-Volatile Memory circuit which operates as an interface between a key loader and an encryption device in a missile's telemetry system. The method includes a step for storing a crypto key and an associated check word and a backup crypto key and check word in the EEPROM of a microcontroller, and a step for indicating the status of a load of the crypto key in the microcontroller as well as a step for indicating the status of an erase of the crypto key from the microcontroller. The method also includes a step for turning off the missile's transmitter when a key load occurs to prevents transmission of the crypto key and its corresponding check word. The method further includes a step for erasing the crypto key and its associated check word from an EEPROM within the microcontroller upon a missile launch.

6 Claims, 8 Drawing Sheets

METHOD WHICH USES A NON-VOLATILE MEMORY TO STORE A CRYPTO KEY AND A CHECK WORD FOR AN ENCRYPTION DEVICE

This application is a continuation-in-part of U.S. patent application Ser. No. 09/505,830, filed Feb. 17, 2000 now U.S. Pat. No. 6,859,537.

BACKGROUND OF THE INVENTION

1. Field of the Invention

The present invention relates generally to a non-volatile memory interface for use with an encryption device. More particularly, the present invention relates to a method which uses a Non-Volatile Memory circuit connected to an encryption device for storing a crypto key and an associated check word of the crypto key for use by the encryption device.

2. Description of the Prior Art

The encryption device used for encrypting data to be transmitted to a ground station via a missile's telemetry system requires a crypto key to be loaded in the encryption device to permit the encryption of the data. The standard key loaders used by the military for crypto key loading are the KOI-18 and the KYK-13. The KOI-18 is a paper type reader that serially outputs the crypto key data and clock as a series of electrical pulses. The KYK-13 is an electrical device that can store up to three crypto keys with their corresponding check word. The KYK-13 outputs data in a manner similar to the KOI-18.

The missile's telemetry system encryption device includes a Non-Volatile Memory circuit which receives the crypto key and an associated check word from the key loader. Upon receiving the crypto key and check word the Non-Volatile Memory circuit will load the encryption device with the crypto key and check word and also display the status of a load. When power is removed from the encryption device, only the Non-Volatile Memory circuit will retain the key data including the crypto key. When power is re-applied to the encryption system, the Non-Volatile Memory circuit automatically reloads the encryption device with the key data. The crypto key will remain in the Non-Volatile Memory circuit until the crypto key is erased from the circuit.

While the Non-Volatile Memory circuits used in the past perform their intended function of key data storage adequately, these circuits generally require substantially more space than is currently available on today's state of the art missile encryption systems. There is now a need to significantly reduce the size of Non-Volatile Memory circuits used with a missile's telemetry system encryption device. There is also a need to provide a method whereby a Non-Volatile Memory circuit stores a crypto key and an associated check word which is to be loaded into an encryption device allowing the encryption device to encrypt telemetry data for transmission to a ground station, a ship, an aircraft or other receiving station.

SUMMARY OF THE INVENTION

The present invention overcomes some of the difficulties of the past including those mentioned above in that it comprises a highly effective and efficient method for storing a crypto key and an associated check word in a Non-Volatile Memory circuit which are then loaded into an encryption device allowing the encryption device to encrypt telemetry data for transmission to a ground station, a ship, an aircraft or other receiving station.

The present invention comprises a method whereby a Non-Volatile Memory circuit operates as an interface between a key loader and an encryption device and stores therein a crypto key and an associated check word for use by the encryption device to encrypt telemetry data after a key load.

The method of the present invention includes the steps of storing a crypto key and an associated check word in the EEPROM of an 8-bit microcontroller and then duplicating the crypto key and the check word which is stored in a backup location of the EEPROM of the 8-bit microcontroller, and a step for indicating the status of a load of the crypto key and check word in the microcontroller as well as a step for indicating the status of an erase of the crypto key and check word from the microcontroller. A pair of light emitting diodes connected to the microcontroller indicate the status of the load of the crypto key and check word within the microcontroller as well as the status of an erase of the crypto key and checkword from the microcontroller.

The method also includes the step of turning off the missile's transmitter when a key load occurs to prevent transmission of the crypto key and its corresponding check word. The method further includes a step for erasing the crypto key and its associated check word from an EEPROM within the microcontroller upon missile launch. This prevents an enemy force from retrieving the crypto key and its associated check word from the missile after launch.

The present invention also provides a step which allows the microcontroller to erase the crypto key and its associated checkword from its EEPROM upon receiving an active erase signal from the missile. The present invention further provides a step for supplying a master clock signal to the microcontroller. A 4 MHz clock signal generator supplies the master clock signal to the microcontroller.

DETAILED DESCRIPTION OF THE PREFERRED EMBODIMENT

Figure 1:
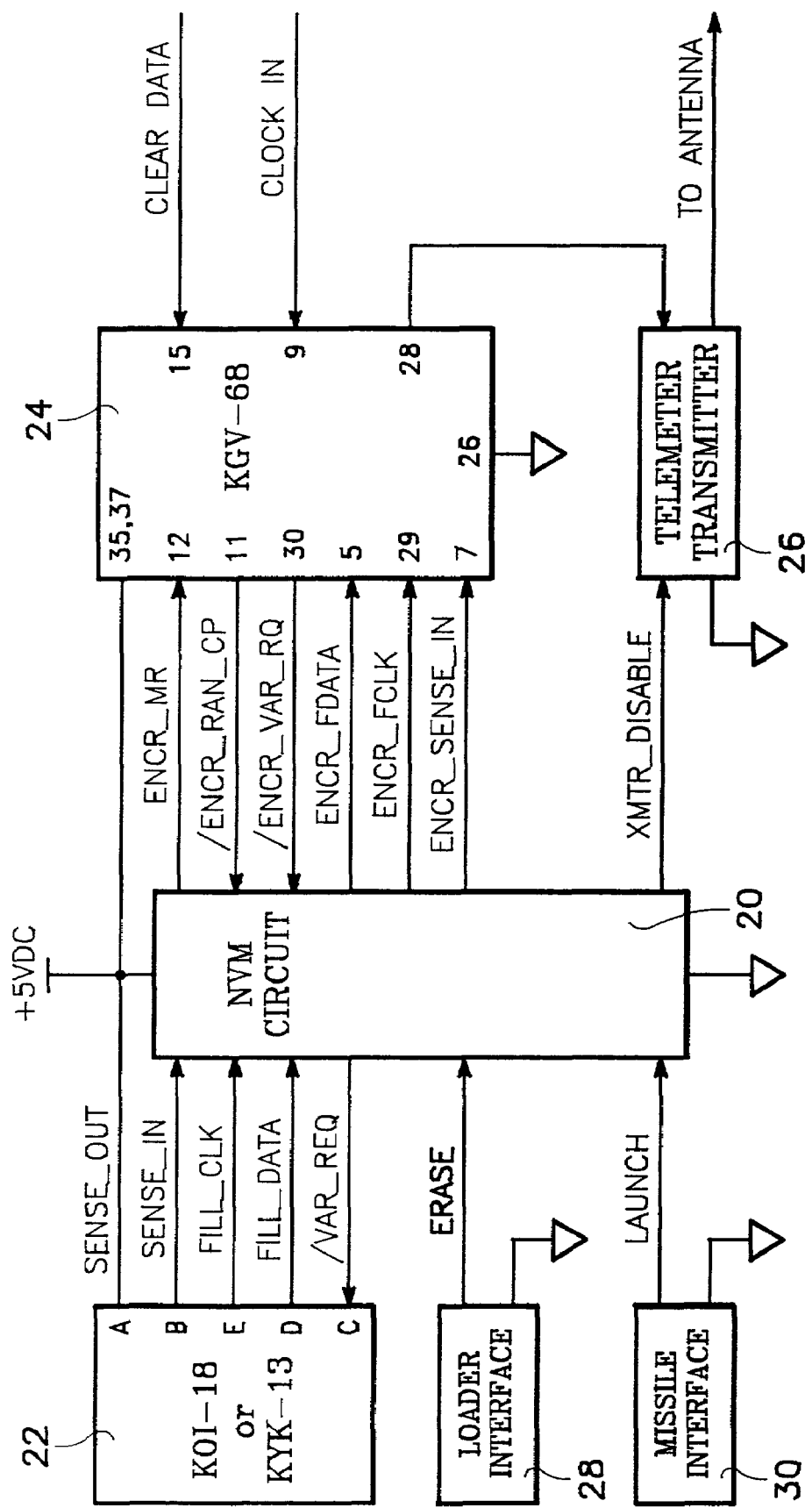
FIG. 1 is a block diagram illustrating a missile's telemetry encryption system and external key loader.
Figure 2:
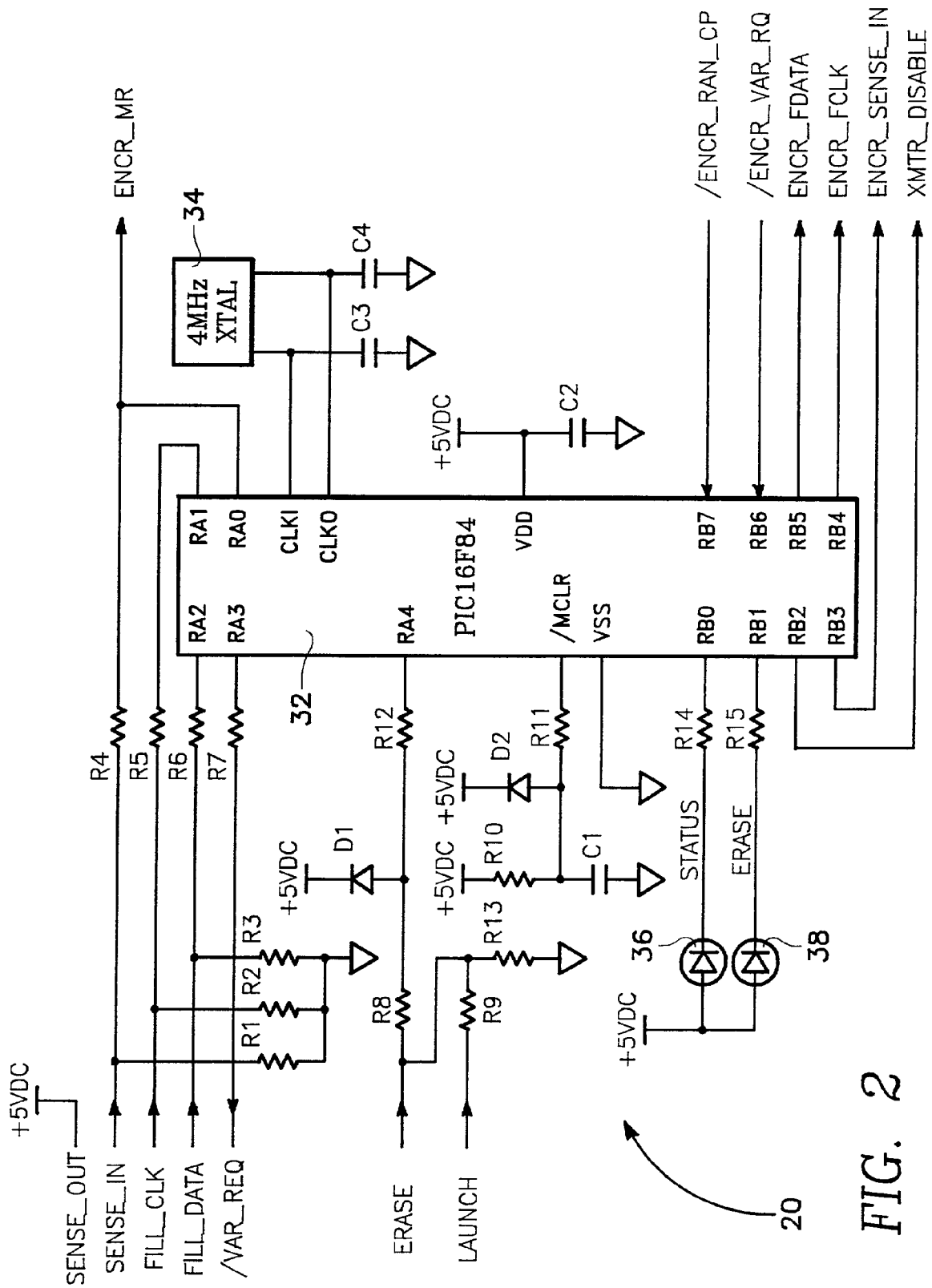
FIG. 2 is a detailed electrical diagram of the Non-Volatile Memory circuit of FIG. 1 which comprises the present invention.

Referring to FIGS. 1 and 2, there is shown a missile's telemetry encryption system which includes a key loader 22 for loading a crypto key with its corresponding/associated check word into a Non-Volatile Memory circuit 20. The key loader 22 may be either a KOI-18 or a KYK-13 key loader. It should be noted that the KYK-13 key loader can store three crypto keys with their corresponding check words.

Non-Volatile Memory circuit 20 is connected to a KGV-68 encryption device 24 which allows Non-Volatile Memory circuit 20 to load a crypto key with its corresponding check word into the encryption device 24. The encryption device 24 is connected to a telemeter transmitter 26 which transmits encrypted telemetry data from encryption device 24 to a ground station, a ship, an aircraft or other receiving station.

As shown in FIG. 2, Non-Volatile Memory circuit 20 includes an 18-pin Flash/EEPROM 8-bit microcontroller 32 which stores the crypto key and corresponding check word used by encryption device 24. The 18-pin Flash/EEPROM 8-bit microcontroller 32 used in the preferred embodiment of the present invention is a Model PIC16F84 microprocessor commercially available from Microchip Technology Inc. of Phoenix, Ariz. Connected to microcontroller 32 is a 4 MHz clock signal generator 34 which supplies the master clock signal to microcontroller 32.

Figure 4:
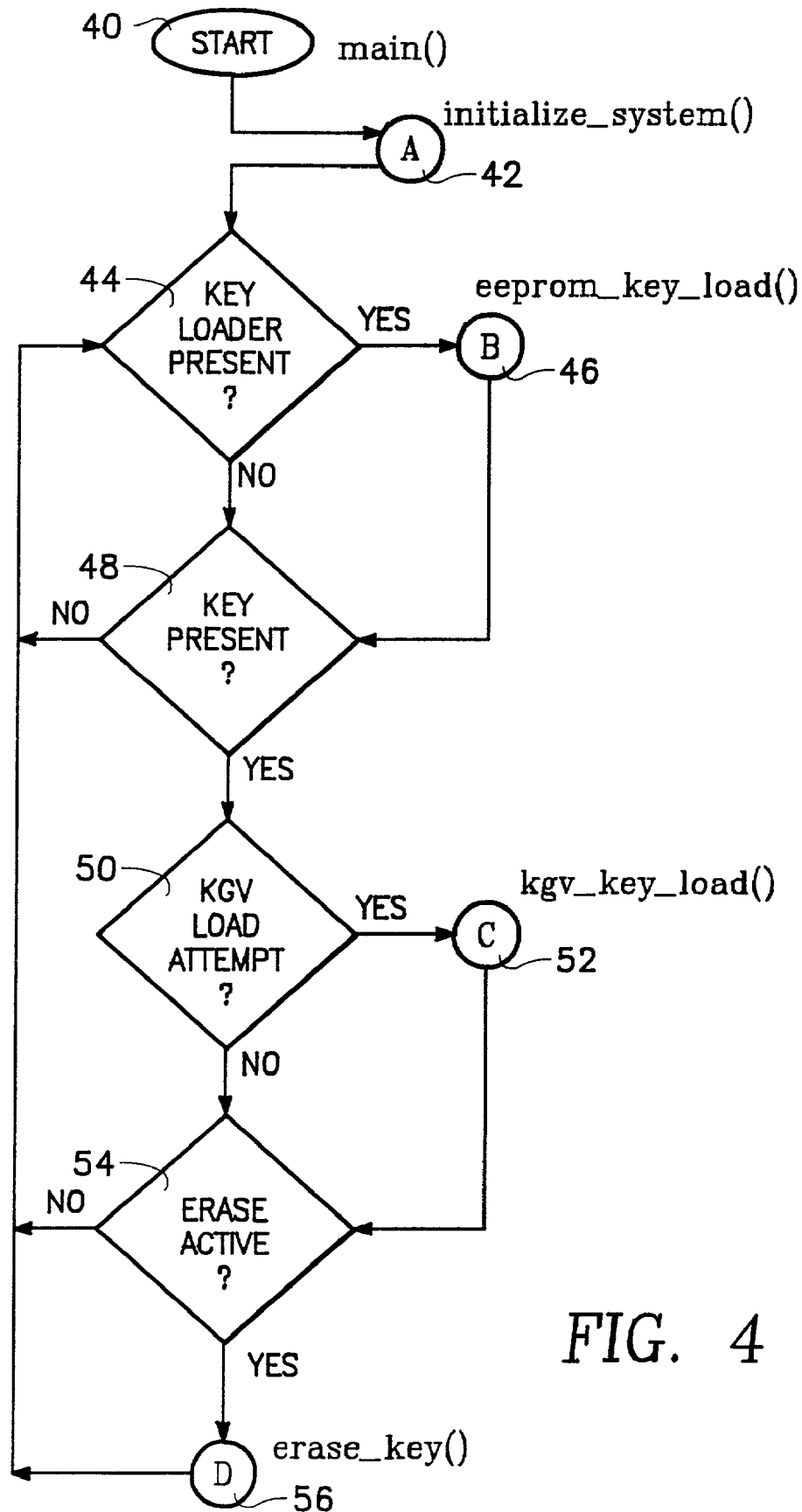
FIGS. 4–9 depicts a flow chart for the software used by the 8-bit microcontroller of FIG. 2 to load a crypto key with its associated check word into the encryption device of FIG. 1.

Referring to FIGS. 1, 2 and 4, there is shown a power up circuit comprising a pair of resistors R10 and R11, a diode D2 and a capacitor C1. When power is first applied to microcontroller 32 upon powering up Non-Volatile Memory circuit 20 a logic zero is supplied to the /MCLR input of microcontroller 32 clearing microcontroller 32. This logic zero then transitions to a logic one which results in microcontroller 32 executing the main routine (FIG.4) of the computer software program within microcontroller 32.

Figure 5:
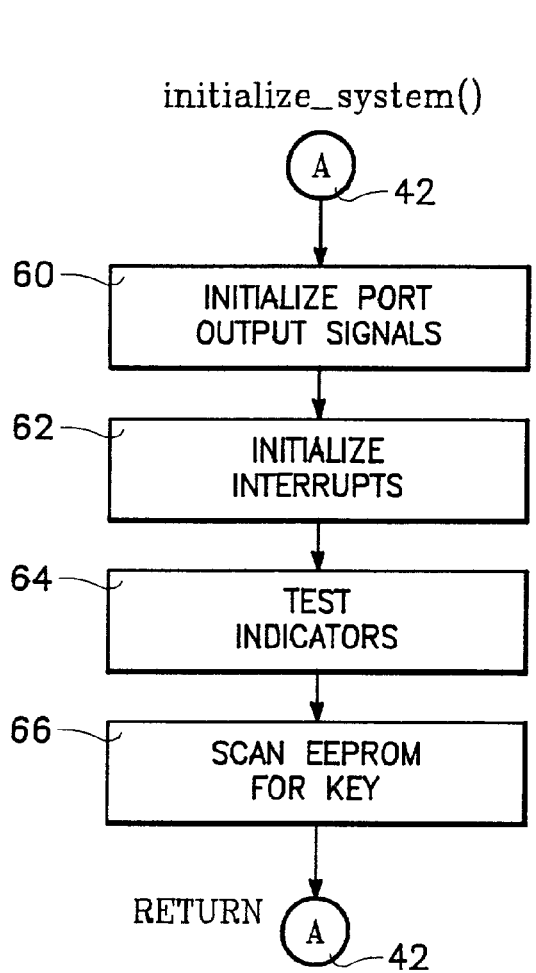
Figure 6:
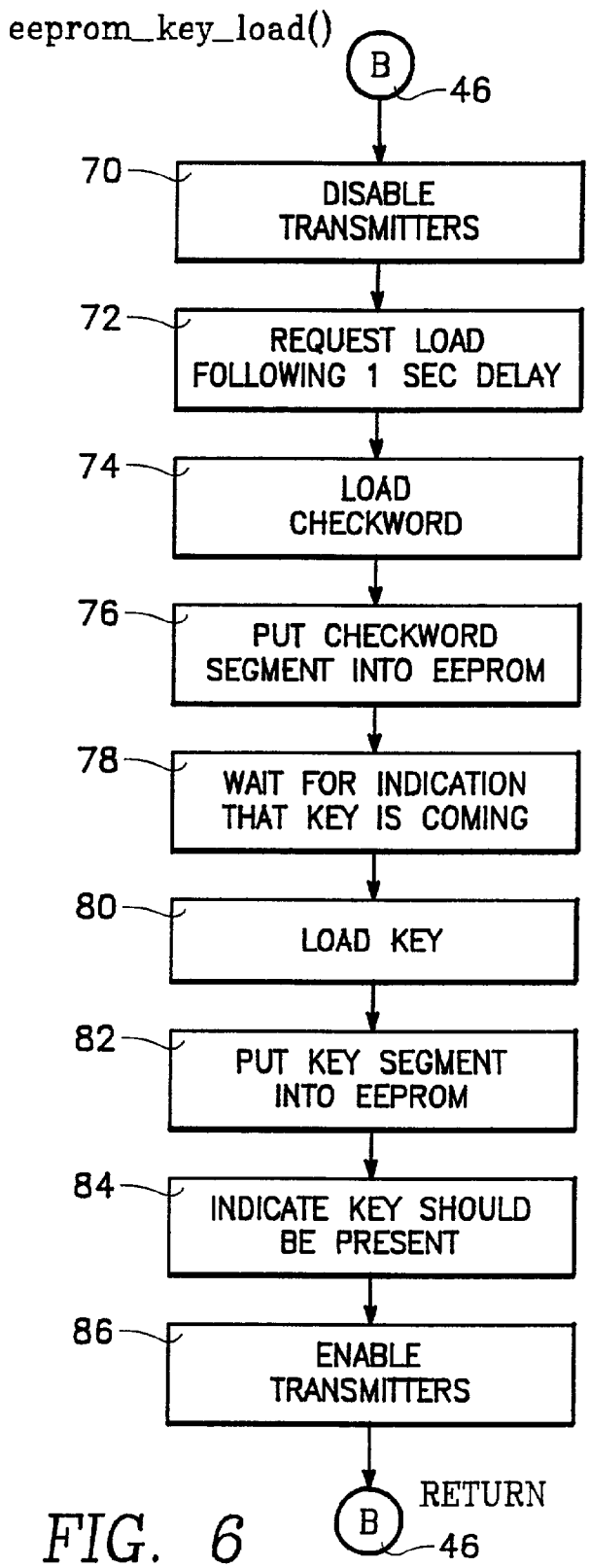

The main routine begins at program step 40, proceeding to program step 42 which is the initialize_system routine illustrated in FIG. 5. The initialize system routine sets all of the port output signals of microcontroller 32 to their initial condition (program step 60); initializes the interrupts for microcontroller 32 (program step 62) and initializes the test indicators which are LEDS 36 and 38 (program step 64). During program step 66 the EEPROM of microcontroller 32 is scanned to determined if a valid crypto key was previously loaded into the EEPROM of microcontroller 32. If a valid key is detected an internal flag is set which allows for a load of the key into encryption device 24 by the computer software.

Figure 3:
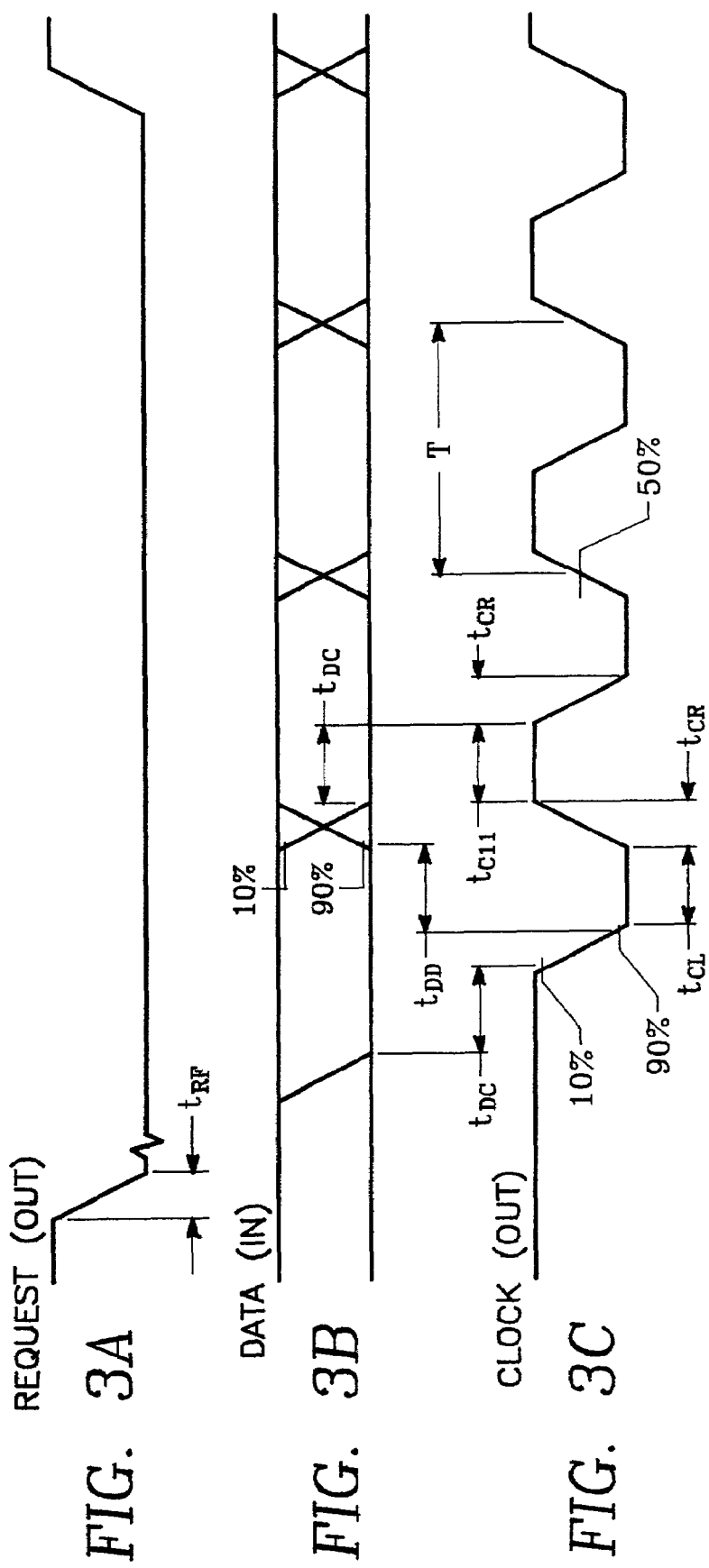
FIGS. 3A–3C illustrate timing and data waveforms associated with a data transfer between the key loader and the Non-Volatile Memory circuit of FIG. 1.

During initialization the /VAR_REQ output of FIG. 3A from microcontroller 32 is set high since this signal is an active low signal. When the /VAR_REQ output signal of FIG. 3A is active low the encryption device 22 serially outputs the crypto key data which is illustrated in FIG. 3B and clock which is illustrated in FIG. 3C to microcontroller 32.

At this time it should be noted that the computer software program for microcontroller 32 is adapted for processing two KGV-68 encryption units although only one is illustrated in FIG. 1. In a security upgrade configuration the software operates in a manner which allows two KGV-68 encryption units to be loaded with a crypto key and its corresponding check word. It should be noted that while FIG. 1 only shows one KGV-68, the non-volatile memory comprising the present invention may be easily modified to accommodate two KGV-68 encryption units.

After initialization the ERASE output from microcontroller 32 is set high since this signal is an active low signal. This turns off LED 38. After initialization the STATUS output from microcontroller 32 is also set high since this signal is an active low signal. This turns off LED 36. During initialization of microcontroller 32 the ERASE output and STATUS output from microcontroller 32 are pulsed to test the operation of LEDS 36 and 38. Setting the ERASE output of microcontroller 32 high indicates that the crypto key has not been erased from microcontroller 32. Setting the STATUS output of microcontroller 32 high indicates that encryption device 24 is not loaded.

The XMTR_DISABLE output from microcontroller 32 is set high during initialization to disable transmitter 26. The ENCR_SENSE_IN output from microcontroller 32 is set low during initialization indicating that the KVG-68 encryption device 24 is not being loaded. The ENCR_FCLK and ENCR_FDATA outputs from microcontroller 32 are set high during initialization. The clock signal provided by microcontroller 32 at the ENCR_FCLK output from microcontroller 32 has an active falling edge necessitating that the signal be set high during initialization of microcontroller 32. Setting the ENCR_FDATA output from microcontroller 32 high results in "0" at the ENCR_FDATA output of microcontroller 32.

Referring to FIGS. 1, 2, 4 and 6, during program step 44, the computer software test for the presence of key loader 22. The SENSE_IN line is monitored by microcontroller 32 to determine the presence of key loader 22. When the SENSE_IN line is high resulting in a "1" at the RA0 input of microcontroller 32, the computer software proceeds to the eeprom_key_load routine of FIG. 6.

During program step 70 transmitter 26 is disabled by microcontroller 32 to prevent possible transmission of the crypto key. During program step 72 the /VAR_REQ output from microcontroller 32 is set low to request the check word from key loader 22. During program step 74 the check word is loaded into the microcontroller 32. During program step 76, the checkword is placed in the EEPROM of microcontroller 32. Program step 78 waits for an indication that the crypto key will be transferred from key loader 22 to the EEPROM of microcontroller 32 with the crypto key being loaded into the EEPROM of microcontroller 32 during program step 82. Program step 80 loads the crypto key into the microcontroller 32. Microcontroller 32 and the computer software also duplicate the crypto key and check word in a backup location in the EEPROM of microcontroller 32.

During program step 84 an indication is provided that the key is present by clearing the ERASE LED 36 turning off the ERASE LED 36. During program step 86, transmitter 26 is enabled by microcontroller 32. During program step 46, the computer software returns to the main program of FIG. 4.

During program step 48, the computer software checks for the presence of the crypto key. If the crypto key is not present, i.e. the key is not accurately read into microcontroller 32, the software returns to program step 44 to determine if the key loader 22 is present. When key loader 22 is present, the computer software will again load the crypto key.

Figure 7:
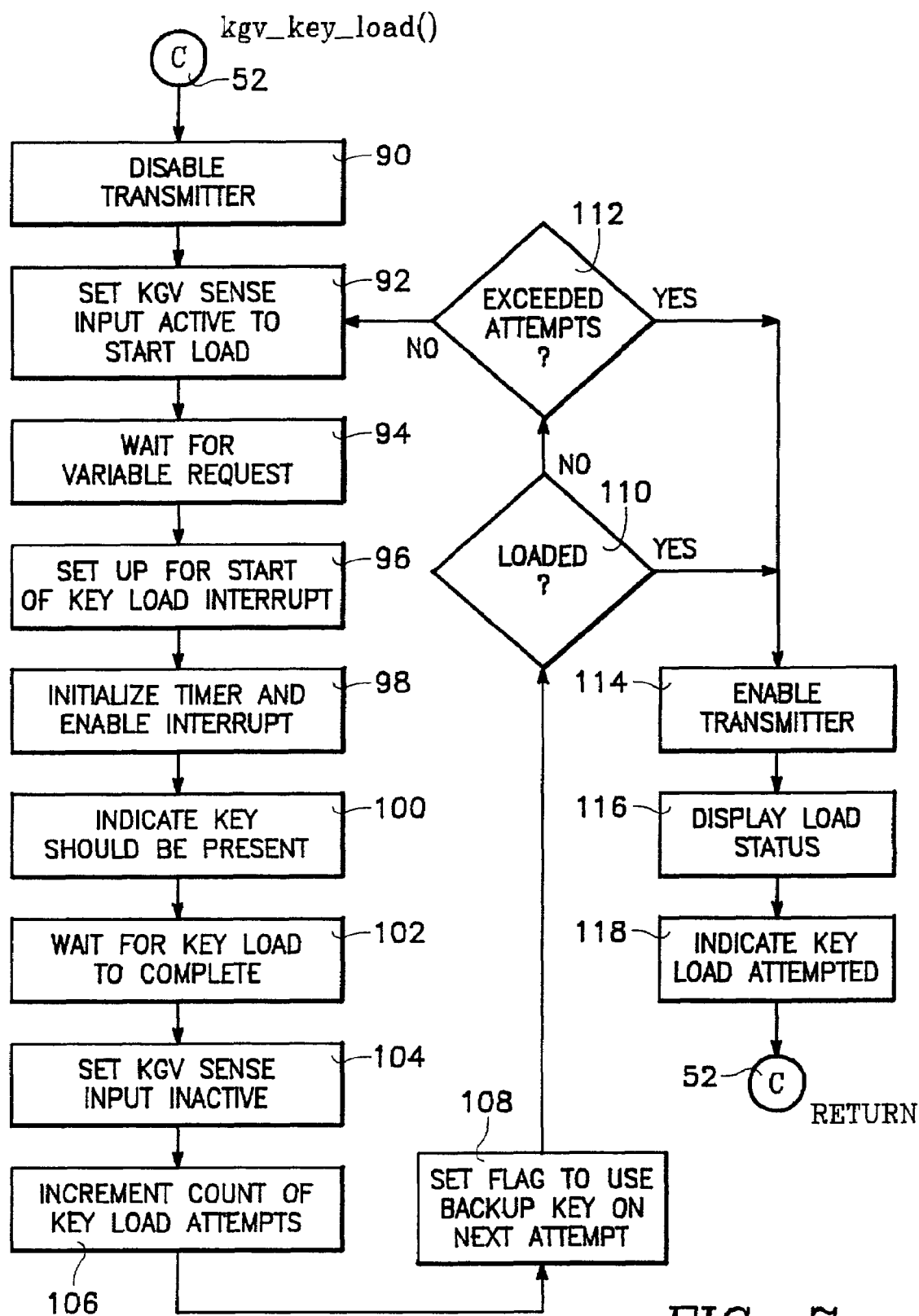

When the crypto key is correctly loaded into microcontroller 32, the computer software proceeds to program step 50 which is the KGV load attempt decision. When a decision is made to load encryption unit 24, the computer software proceeds to the routine kgv_key_load of FIG. 7 (program step 52). During program step 90, transmitter 26 is disabled.

During program step 92 the KGV sense input (ENCR_SENSE_IN) is set active, i.e. the logic "one" state, to start a load of the crypto key with its corresponding check word. Encryption unit 24 then responses with an active low variable request signal (/ENCR_VAR_RQ) to microcontroller 32 (program step 94). During program step 96, there is a set up for the start of the key load interrupt within microcontroller 32. During program step 98 an internal timer within microcontroller 32 is initialized and the key load interrupt is enabled for the key loading process.

During program step 100 there is an indication within microcontroller 32 that the key should be present. During program step 102 a wait routine occurs which allows for completion of the key load process. When the key load process is complete, which is an internal indication from the interrupt routine, the KGV sense input (ENCR_SENSE_IN) is set inactive, i.e. a logic "zero" state (program step 104).

During program step 106, the computer software increments the count to keep track of the key load attempts.

During program step 108 the computer software sets a flag to use the backup key on the next attempt. A second crypto key with its corresponding check word are stored in the EEPROM of microcontroller 32. This backup key is utilized in the event that the primary key is not functional. Loading of the backup crypto key in the KVG-68 encryption device 24 is determined by acceptance or non-acceptance of the primary crypto key by encryption device 24.

During program step 110, the computer software determines whether the key is loaded by testing random compare input (/ENCR_RAN_CP) to microcontroller 32. The answer will be no since there is a requirement that the routine kgv_key_load of FIG. 7 be processed twice to load the crypto key and the check word into encryption device 24.

At this time it should be noted that the check word is loaded first followed by the crypto key. During program step 112 the computer software determines whether there has been more than three attempts to load the check word and the crypto key, which equates to six loops of the routine kgv_key_load of FIG. 7. If the answer is "yes" then transmitter 26 is enabled during program step 114. When this occurs the light emitting diode 36 will blink (program step 116) to indicate that microcontroller 32 has been unsuccessful in its attempt to load encryption device 24.

When a load of encryption device 24 is successful light emitting diode 36 remains on (program step 116). During program step 118, the computer software sets an internal flag indicating that a key load has been attempted. This prevents an inadvertent return to the routine kgv_key_load of FIG. 7.

The computer software next returns to main routine of FIG. 4. During program step 54, a determination is made as to whether or not the key should be erased. When the ERASE input to microcontroller 32 is high (RA4 input to microcontroller 32), the software proceeds to the erase key( ) routine 56 (FIGS. 4 and 8) and the microcontroller 32 erases the check word and the crypto key as well as its backup from the EEPROM within microcontroller 32. Five random writes are performed within the EEPROM within microcontroller 32. This logic one signal, i.e. ERASE signal is provided by the loader interface 28 or the missile interface 30 to the RA4 input of microcontroller 32. The signal provided by the missile interface 30 is substantially higher than digital logic levels necessitating the use of additional resistor R9 in the LAUNCH line connecting missile interface 30 to microcontroller 32.

Figure 8:
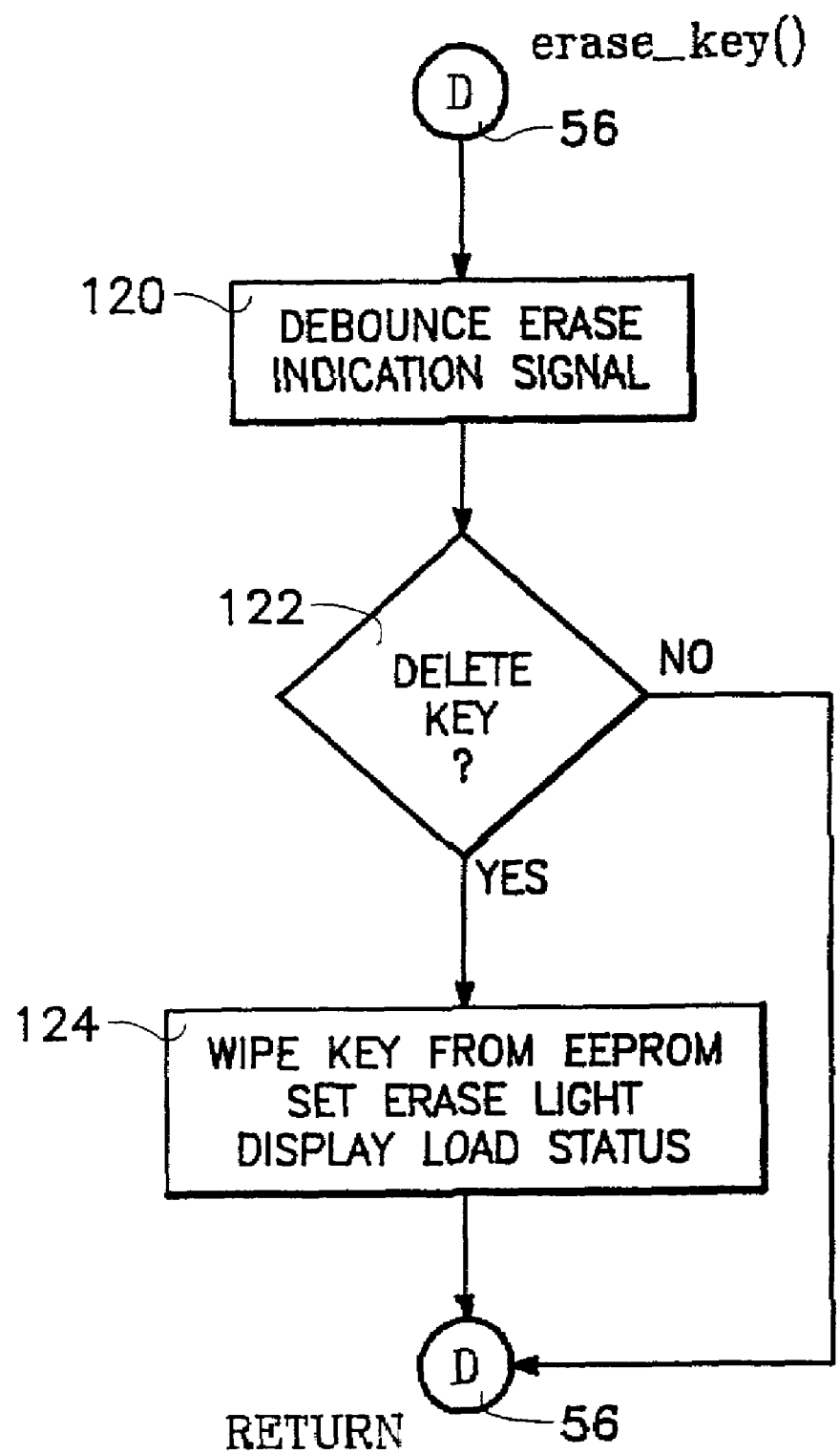

Referring to FIG. 8, the routine for erasing the EEPROM within microcontroller 32 is the erase_key routine 56. Program step 120 debounces the erase indication signal provided to the RA4 input to microcontroller 32. The computer software then proceeds to program step 122 to determine whether to erase the crypto key with its corresponding check word from the EEPROM within microcontroller 32. Whenever the signal provided to the RA4 input to microcontroller 32 is a logic "one", the computer software proceeds to program step 124 erasing the crypto key with its corresponding check word from the EEPROM within microcontroller 32. The erase light, i.e. light emitting diode 38 is set, and the load status is displayed during program step 124.

Figure 9:
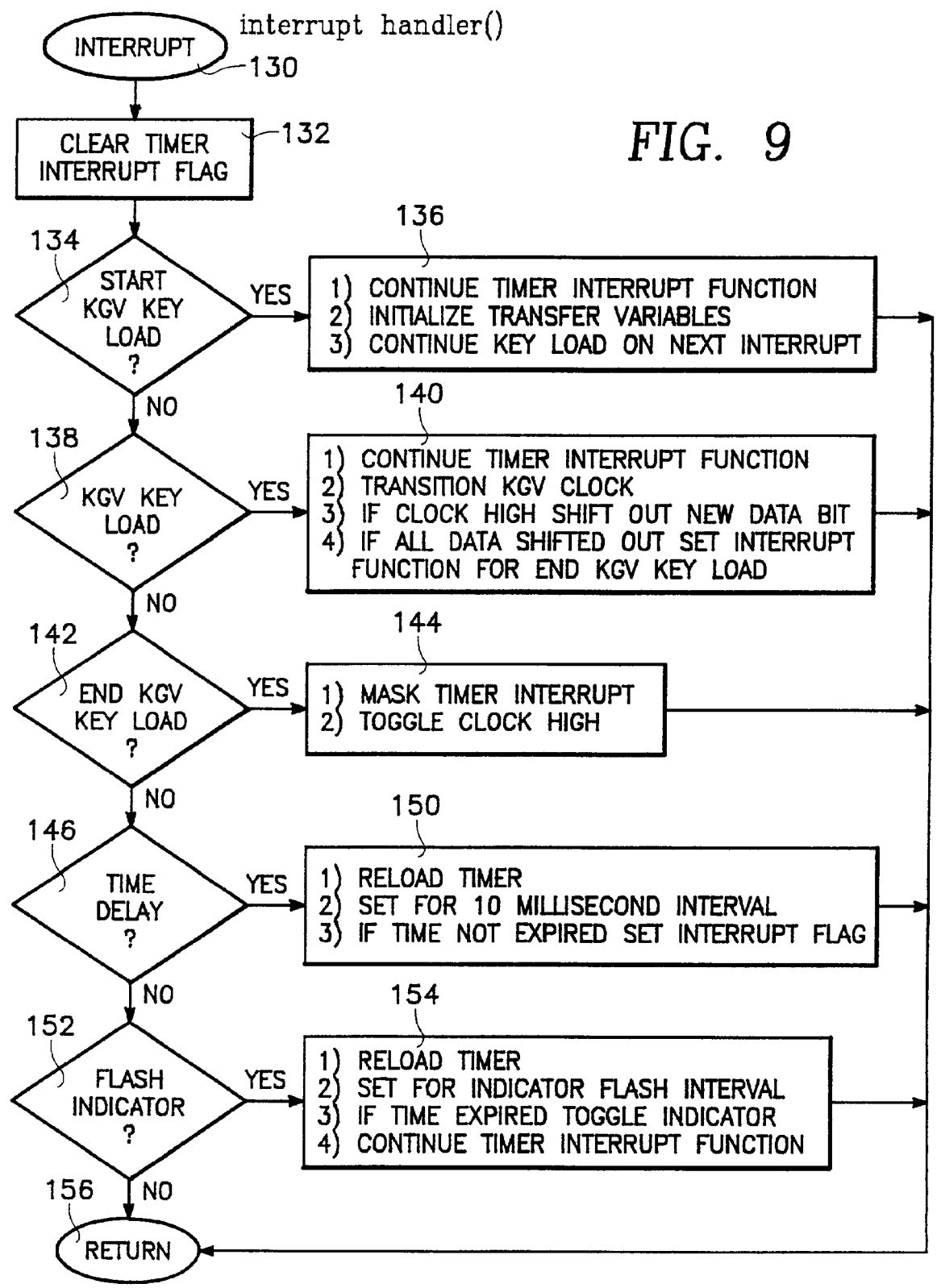

Referring to FIG. 9. FIG. 9 depicts the interrupt handler( ) routine 130. The interrupt handler( ) routine 130 looks for any interrupt within the computer software for microcontroller 32. For example, a timer interrupt will occur and a timer is initialized during program step 98 of FIG. 7. When the timer of program step 98 expires, an interrupt is generated and the software proceeds to the interrupt handler( ) routine 130. Program step 132 clears a timer interrupt flag and the software proceeds to program step 134, which is a decision program step. When the software determines that the crypto key and its associated checkword is to be loaded into encryption unit 24, the software proceeds to program step 136. During program step 136, the software continues the timer interrupt function and initializes transfer variables. The key load is also continued on the next interrupt.

Program step 138 is a decision program step which occurs during the loading of the crypto key and its associated checkword into encryption unit 24. When the decision is "YES" the software proceeds to program step 140. During program step 140, the software continues the timer interrupt function and transitions the KGV clock. If the clock signal is high a new data bit is shifted out to encryption unit 24. When all the data has been shifted out of microcontroller 32 to encryption unit 24, the interrupt function is set for an end KGV key load. When the decision is "N0", the software proceeds to program step 142.

Program step 142 is a decision program step which determines if the KGV key load is completed. When the key end is completed, i.e. the answer is "YES", the software proceeds to program step 144 masking the timer interrupt and toggling the clock signal high. When the answer if "N0", the software proceeds to program step 146 which is a time delay decision program step.

When microcontroller 32 is in a time delay, the software proceeds to program step 150 reloading the timer, setting the timer for 10 millisecond intervals and if time has not expired setting the interrupt flag.

When there is no time delay, the software proceeds to program step 152. Program step 152 is a decision program step which is implemented when the ERASE LED 36 and the STATUS LED 38 are activated. Program step 154 reloads the timer and sets the timer for indicator flash interval. In addition, the software toggles the indicator 36 or 38 if time has expired and also continues the timer interrupt function. Program step 156 is the return program step during which the software exits the interrupt handler( ) routine 130.

From the foregoing, it may readily be seen that the present invention comprises a new, unique and exceedingly useful method which uses a non-volatile memory to store a crypto key and a check word for an encryption device which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A method for providing a crypto key and an associated checkword of said crypto key to an encryption device for a telemeter system of a missile, said method comprising the method steps of:

(a) generating said crypto key and said associated checkword wherein a key loader generates said crypto key and said associated checkword;

(b) transferring said crypto key and said associated check word from said key loader to a microcontroller having a memory for a duplication and a storage of said crypto key and said associated check word within said memory;

(c) disabling a transmitter connected to said microcontroller when the transfer of said crypto key and said associated check word to said microcontroller occurs to prevent a transmission of said crypto key and said associated check word by said transmitter;

(d) duplicating said crypto key and said associated check word within said microcontroller to provide a duplicate of said crypto key and a duplicate of said associated check word;
(e) storing said crypto key, said associated check word, the duplicate of said crypto key and the duplicate of said associated check word in the memory of said microcontroller;
(f) enabling said transmitter after the storage of said crypto key and said associated check word within the memory of said microcontroller;
(g) disabling said transmitter prior to a load of said crypto key and said associated check word into said encryption device;
(h) loading said crypto key and said associated check word from the memory of said microcontroller into said encryption device wherein said crypto key when loaded into said encryption device provides for encryption of telemetry data transmitted to a ground station by the telemetry system of said missile;
(i) enabling said transmitter after the load of said crypto key and said associated check word into said encryption device;
(j) erasing said crypto key and said associated check word from the memory of said encryption device upon a launch of said missile to prevent an enemy force from retrieving said crypto key and said associated check word from the missile after the launch of said missile; and
(k) providing a computer software program executable by said microcontroller to perform the method steps of:
(i) transferring said crypto key and said associated checkword from said key loader to said microcontroller;
(ii) disabling said transmitter when the transfer of said crypto key and said associated check word to said microcontroller occurs;
(iii) duplicating said crypto key and said associated check word within said microcontroller:
(iv) storing said crypto key, said associated check word, the duplicate of said crypto key and the duplicate of said associated check word in the memory of said microcontroller:
(v) loading said crypto key and said associated check word from the memory of said microcontroller into said encryption device;
(vi) enabling said transmitter after the load of said crypto key and said associated check word into said encryption device; and
(vii) erasing said crypto key and said associated check word from the memory of said encryption device upon a launch of said missile.

2. The method of claim 1 comprising the additional method step of loading the duplicate of said crypto key and the duplicate of said check word into said encryption device when said encryption device rejects said crypto key wherein said computer software program is executable by said microcontroller to perform the additional method step of loading the duplicate of said crypto key and the duplicate of said check word into said encryption device when said encryption device rejects said crypto key.

3. The method of claim 1 comprising the additional method step of indicating a status of a store of said crypto key and said associated check word into the memory of said microcontroller wherein said computer software program is executable by said microcontroller to perform the additional method step of indicating the status of the store of said crypto key and said associated check word into the memory of said microcontroller.

4. The method of claim 3 wherein the status of the store of said crypto key and said associated check word into the memory of said microcontroller is indicated by a light emitting diode connected to said microcontroller.

5. The method of claim 1 comprising the additional method step of indicating a status of an erase of said crypto key and said associated check word from the memory of said microcontroller wherein said computer software program is executable by said microcontroller to perform the additional method step of indicating the status of the erase of said crypto key and said associated check word from the memory of said microcontroller.

6. The method of claim 5 wherein the status of the erase of said crypto key and said associated check word from the memory of said microcontroller is indicated by a light emitting diode connected to said microcontroller.

* * * * *